US010334032B2

(12) United States Patent
Sun et al.

(10) Patent No.: US 10,334,032 B2
(45) Date of Patent: Jun. 25, 2019

(54) ENERGY-SAVING DEPLOYMENT METHOD OF VIRTUAL CDN

(71) Applicant: University of Electronic Science and Technology of China, Chengdu (CN)

(72) Inventors: Gang Sun, Chengdu (CN); Dan Liao, Chengdu (CN); Dongcheng Zhao, Chengdu (CN); Guanghua Yang, Chengdu (CN); Hongfang Yu, Chengdu (CN)

(73) Assignee: University of Electronic Science and Technology of China, Chengdu (CN)

(*) Notice: Subject to any disclaimer, the term of this patent is extended or adjusted under 35 U.S.C. 154(b) by 188 days.

(21) Appl. No.: 15/680,209

(22) Filed: Aug. 18, 2017

(65) Prior Publication Data

US 2018/0248939 A1 Aug. 30, 2018

(30) Foreign Application Priority Data

Feb. 27, 2017 (CN) .......................... 2017 1 0107267

(51) Int. Cl.
*H04L 29/08* (2006.01)
*H04L 12/24* (2006.01)
(Continued)

(52) U.S. Cl.
CPC ...... *H04L 67/1008* (2013.01); *H04L 41/0803* (2013.01); *H04L 41/142* (2013.01);
(Continued)

(58) Field of Classification Search
None
See application file for complete search history.

(56) References Cited

U.S. PATENT DOCUMENTS

| 2009/0019201 A1* | 1/2009 | Chainer | ................. H04L 41/12 710/107 |
| 2009/0222544 A1* | 9/2009 | Xiao | ..................... H04L 41/147 709/223 |

(Continued)

OTHER PUBLICATIONS

Liao, Dan & Sun, Gang & Yang, Guanghua & Chang, Victor. Energy-efficient virtual content distribution network provisioning in cloud-based data centers. Future Generation Computer Systems. (Year: 2018).*

(Continued)

*Primary Examiner* — Nasser M Goodarzi
*Assistant Examiner* — Terrika Peterson
(74) *Attorney, Agent, or Firm* — Gokalp Bayramoglu

(57) ABSTRACT

The present invention discloses an energy-saving deployment method of a virtual CDN. According to the historical flow data of the virtual CDN and the prediction model (ARIMA) in the controller, the network peak flow in the next time period is predicted. Next, the scale of the virtual CDN system at the next moment is calculated according to the peak flow. Meanwhile, several redundant servers are added to correct the prediction error. The network flow is aggregated to the desired virtual servers based on the calculation of the controller through a load balancer. In this way, the utilization rate of the virtual CDN system can be increased, and the energy consumed due to the higher utilization rate of the CDN system is saved.

2 Claims, 4 Drawing Sheets

(51) Int. Cl.
*H04L 12/26* (2006.01)
*G06F 1/3287* (2019.01)

(52) U.S. Cl.
CPC .......... *H04L 41/145* (2013.01); *H04L 41/147* (2013.01); *H04L 41/16* (2013.01); *H04L 41/20* (2013.01); *H04L 43/14* (2013.01); *H04L 67/1002* (2013.01); *H04L 67/1031* (2013.01); *H04L 67/101* (2013.01)

(56) References Cited

U.S. PATENT DOCUMENTS

2015/0180719 A1\* 6/2015 Wu .................... H04L 41/0896 709/224
2019/0025903 A1\* 1/2019 Mehta .................. G06F 1/3287

OTHER PUBLICATIONS

Ismael Cuadrado-Cordero. Microclouds : an approach for a network-aware energy-efficient decentralised cloud. Networking and Internet Architecture : Université Rennes (Year: 2017).\*

\* cited by examiner

| Autocorrelation | Partial Correlation | | AC | PAC | Q-Stat | Prob |
|---|---|---|---|---|---|---|
| | | 1 | -0.354 | -0.354 | 42.324 | 0.000 |
| | | 2 | -0.014 | -0.159 | 42.390 | 0.000 |
| | | 3 | -0.071 | -0.156 | 44.096 | 0.000 |
| | | 4 | 0.105 | 0.019 | 47.872 | 0.000 |
| | | 5 | -0.001 | 0.040 | 47.872 | 0.000 |
| | | 6 | -0.010 | 0.021 | 47.904 | 0.000 |
| | | 7 | -0.000 | 0.025 | 47.904 | 0.000 |
| | | 8 | -0.013 | -0.008 | 47.958 | 0.000 |
| | | 9 | -0.064 | -0.082 | 49.371 | 0.000 |
| | | 10 | -0.033 | -0.119 | 48.750 | 0.000 |
| | | 11 | 0.022 | -0.089 | 49.919 | 0.000 |
| | | 12 | -0.066 | -0.124 | 51.436 | 0.000 |
| | | 13 | -0.074 | -0.177 | 53.331 | 0.000 |
| | | 14 | 0.032 | -0.080 | 53.685 | 0.000 |
| | | 15 | -0.057 | -0.139 | 54.849 | 0.000 |
| | | 16 | 0.010 | -0.100 | 54.884 | 0.000 |
| | | 17 | -0.040 | -0.110 | 55.464 | 0.000 |
| | | 18 | 0.040 | -0.058 | 56.030 | 0.000 |
| | | 19 | -0.048 | -0.117 | 56.832 | 0.000 |
| | | 20 | 0.073 | -0.031 | 58.736 | 0.000 |
| | | 21 | -0.053 | -0.106 | 59.729 | 0.000 |
| | | 22 | 0.036 | -0.108 | 60.209 | 0.000 |
| | | 23 | 0.062 | -0.022 | 61.605 | 0.000 |
| | | 24 | 0.103 | 0.080 | 65.464 | 0.000 |
| | | 25 | -0.053 | 0.008 | 66.471 | 0.000 |
| | | 26 | 0.016 | 0.006 | 66.565 | 0.000 |
| | | 27 | 0.109 | 0.129 | 70.829 | 0.000 |
| | | 28 | 0.006 | 0.088 | 70.829 | 0.000 |
| | | 29 | -0.024 | 0.048 | 71.145 | 0.000 |
| | | 30 | -0.022 | 0.015 | 71.339 | 0.000 |
| | | 31 | 0.082 | 0.098 | 73.846 | 0.000 |
| | | 32 | -0.140 | -0.074 | 81.122 | 0.000 |
| | | 33 | 0.045 | 0.013 | 81.894 | 0.000 |
| | | 34 | -0.021 | 0.013 | 82.059 | 0.000 |
| | | 35 | -0.096 | -0.114 | 85.540 | 0.000 |
| | | 36 | 0.036 | 0.023 | 86.042 | 0.000 |

Figure 4

ENERGY-SAVING DEPLOYMENT METHOD OF VIRTUAL CDN

CROSS REFERENCE TO RELATED APPLICATIONS

This application is based upon and claims priority to Chinese Patent Application No. 201710107267.4, filed on Feb. 27, 2017, the entire contents of which are incorporated herein by reference.

TECHNICAL FIELD

The present invention relates to the field of network function virtualization, and particularly relates to an energy-saving deployment method of a virtual CDN.

BACKGROUND OF THE INVENTION

The large distributed systems in the world usually compose of thousands of servers deployed in a data center. These systems acting as the infrastructure can effectively support businesses such as electronic commerce, network news, and a social network, etc. However, since there are large number of servers in the distributed systems, the energy consumption is very huge. Meanwhile, the huge energy consumption also increases the global carbon emission, which is detrimental to the environment. According to a related research, the annual energy consumption of a large distributed network composed of 100000 servers can be 190000 MWH. The energy is equivalent to the annual consumption of one hundred thousand families.

The content distribution network CDN is a typical representative of the large-scale distributed system. A primary purpose of a CDN network is to transfer the content from a far-end server to a copy server close to the terminal user, so as to improve the network performance. The traditional CDN network, for example, Akamai, is composed of ten thousand servers deployed among worldwide data centers. Generally, a server in a traditional CDN network is composed of a firewall, a server, a router, a content gateway, and the like. The components are redundantly combined to meet the peak flow of the network, so as to improve the service experience of the user. However, the research shows that the average load rate of the CDN component designed for meeting the peak flow is only 40%-60% under the non-peak value condition. The traditional CDN component is usually composed of special hardware equipment. The energy consumption of the special hardware is surprisingly high, and it is very inconvenient to dynamically change the scale of the hardware equipment. In the network function virtualization environment, the CDN network component can be deployed on a universal hardware server by special equipment software, so that the number of the software can be dynamically adjusted through the control center to adapt to the dynamically changing flow. Thus, the purpose of energy saving is achieved.

There are lot of existing researches on the network flow prediction problem. One of the network flow prediction methods is called a BP neural network. The BP neural network is a bionic method or an artificial intelligence method. The BP neural network is divided into two processes: (1) a working signal forward transmission process and (2) an error signal reverse transmission process. In the BP neural network, a single sample has m inputs and n outputs. Usually, a plurality of hidden layers are arranged between the input layer and the output layer. In the year of 1989, Robert Hecht-Nielsen proves that one continuous function in any closed interval can be approximated by a BP network of one hidden layer. Therefore, a three-layer BP neural network (an input layer, a hidden layer, and an output layer) can achieve any mapping of m-dimension to n-dimension. As to time series prediction, any continuous m historical average flow data are mapped to an average flow data in the next n time periods, so that the BP neural network can be applied to predict the network flow. However, this technology has the following disadvantages:

(1) The BP neural network has a high complexity and long convergence time.

(2) The predicted result is the average flow in the next time period. Thus, if the CDN scale is determined based on the predicted result, the flow at a moment that exceeds the average value in the time period cannot be effectively served.

(3) In terms of the BP neural network algorithm, the selection of the hidden layer lacks theoretical guidance, and there is a tendency of learning the new sample while forgetting the old sample during training.

In the CDN energy-saving scheme, the relevant research uses the average flow of the previous time period as a direct reference to determine the network scale of the next time period. Meanwhile, redundant servers are added to prevent server congestion caused by peak flow. In the process of determining the network scale, the non-full load capacity of the server is used as a basis for judgment, and the purpose is to increase the redundant capacity to deal with the sudden peak flow. The technology also has the following disadvantages:

(1) Although the network flow of the previous time period is used as a basis to predict the network flow to a certain extent, the error is large.

(2) The redundant design in the scheme increases the energy consumption of the CDN to a certain extent.

SUMMARY OF THE INVENTION

The invention aims to overcome the defects in the prior art and provides an energy-saving deployment method of the virtual CDN, in which the scale of the virtual CDN system is dynamically adjusted according to the change of the network flow.

In order to achieve the objective of the invention, the invention provides an energy-saving deployment method of a virtual CDN, including the following steps:

(1) processing historical flow data;

firstly, obtaining the historical flow data in a period of time T; next, taking time t as a time slice, t<<T, calculating an average value of the historical flow data in the time slice, and obtaining a time sequence;

taking every k values in the time sequence as a group, calculating a maximum value of each group, and obtaining a sequence S, $S=\omega_1, \omega_2, \ldots, \omega_n$;

(2) predicting values of sequence $\omega_{n+1}$;

according to the sequence S, predicting the values of sequence $\omega_{n+1}$ using an ARIMA(p, d, q) prediction model; wherein d is a differential order, p and q are model parameters;

(2.1) obtaining a sequence after $d^{th}$ order difference;

determining the differential order d of the ARIMA(p, d, q) prediction model by an EVIWS software; increasing the differential order d progressively from a zero order, sequentially judging whether the sequence after the difference is stable; if the sequence is stable, stopping a follow-up judgment and taking a current order value as the differential order d;

the sequence after the $d^{th}$ order difference is $S^d=D(\omega_1)^d$, $D(\omega_2)^d, \ldots, D(\omega_n)^d$, wherein $D(\omega_i)^d=(1-\Delta)^d\omega_i$, $1 \le i \le n$, $\Delta$ is a differential operator and is obtained by recursion below:

$$\Delta\omega_i=\omega_{i-1}$$

$$\Delta^2\omega_i=\Delta(\Delta\omega_i)-\Delta(\omega_{i-1})=\omega_{i-2};$$

(2.2) determining parameters p and q;

obtaining a set of an autocorrelation sequence and a partial autocorrelation sequence according to the sequence $S^d=D(\omega_1)^d, D(\omega_2)^d, \ldots, D(\omega_n)^d$ after the $d^{th}$ order difference;

defining a two-time confidence interval as [0, 0.05]; determining values of the parameters p and q by obtaining a subscript at which the autocorrelation sequence values and partial autocorrelation sequence values fall within the two-time confidence interval;

(2.3) predicting a differential value $D(\omega_{n+1})^d$;

$$D(\omega_{n+1})^d = \zeta_1 D(\omega_n)^d + \zeta_2 D(\omega_{n-1})^d +, \ldots,$$
$$\zeta_p D(\omega_{n-p+1})^d + o_{n+1} + k_1 o_n + k_2 o_{n-1} +, \ldots, k_q o_{n-q+1},$$

wherein $\zeta_1, \ldots, \zeta_p$ and $K_1, \ldots, K_q$ are model parameters; $O_n$ is a random error at a moment n, and $O_n$ conforms to Gaussian distribution and has a zero mean;

(2.4) modifying a difference formula in the step S2.1 as $D(\omega_{n+1})^d=(1-\Delta)^d\omega_{n+1}$; next, reversely deducing the values of the sequence $\omega_{n+1}$ based on a prediction differential value;

(3) determining a scale of a virtual CDN system;

(3.1) calculating the scale of the virtual CDN system through a following formula:

$$num_{n+1} = \left\lceil \frac{\omega_{n+1}}{\lambda * PC} \right\rceil$$

wherein PC represents a maximum flow allowable by a function of a single software; $\lambda$ is a percentage of the maximum flow, a value of $\lambda$ is $0<\lambda<=1$, and $\lambda$ is used for limiting a flow of the function of the single software to be no more than $\lambda$ times of the maximum flow; $num_{n+1}$ represents the number of network functions at the next moment, namely, the scale of the virtual CDN system; and $\lceil \ \rceil$ represents upward rounding;

(3.2) adding redundant servers;

if each general server loads m software-based network functions, the number of the general servers required at the next moment is $$\left\lceil \frac{num_{n+1}}{m} \right\rceil;$$

wherein M is defined as a maximum number of available services, $\mu$, $0 \le \mu < 1$ is a percentage of the maximum number M, and $M*\mu$ is the number of the redundant servers;

then, the number of opened servers finally is:

$$num_{n+1} = \min\left(M, M*\mu + \left\lceil \frac{num_{n+1}}{m} \right\rceil\right);$$

(4) calculating an energy consumption of the virtual CDN system;

(4.1) calculating an energy consumption of a single server as $P(\alpha)=P_{idle}+(P_{peak}-P_{idle})*\alpha$; wherein $\alpha$, $0 \le \alpha \le 1$ is a load rate of the single server; and $P_{idle}$ is a no-load power; $P_{peak}$ is a full-load power;

(4.2) summing up the energy consumption of each server to obtain the energy consumption of the virtual CDN system;

(5) in a current time period, continuously counting a flow in the current time period according to a method of the step S1, and obtaining a real value of the flow in the current time period; correcting a prediction sequence $\omega_{n+1}$ through the real value of the flow; finally, adding a corrected sequence $\omega_{n+1}$ to a tail end of the sequence S, and returning to the step S2.3 to restart a prediction and deployment work of the next time period.

Further, in the step (2.3), a method of estimating the model parameters $\zeta_1, \ldots, \zeta_p$ and $K_1, \ldots, K_q$ is utilizing a maximum likelihood estimation method;

if a differential sequence $S^d=D(\omega_1)^d, D(\omega_2)^d, \ldots, D(\omega_n)^d$ conforms to an independent multivariate normal distribution, let $\beta=(\zeta_1, \zeta_2, \ldots, \zeta_p, K_1, K_2, \ldots, K_n)^T$ and $\Sigma_n=E(S^d(S^d)^T)=\Omega\sigma^2$, wherein $\Omega$ is a covariance matrix of the sequence $S^d$, $\sigma 2$ is a constant variance; then a likelihood function of $S^d$ is $$L(\beta, S^d) = p(D(\omega_1)^d, D(\omega_2)^d, ,D(\omega_n)^d; \beta)$$
$$= (2\pi)^{-\frac{n}{2}} |\Sigma_n|^{\frac{1}{2}} \exp\left\{\frac{(S^d)^T \Sigma_n^{-1} S^d}{2}\right\}$$
$$= (2\pi)^{-\frac{n}{2}} (\sigma^2)^{-\frac{n}{2}} |\Omega|^{-\frac{1}{2}} \exp\left(-\frac{(S^d)^T \Omega S^d}{2\sigma^2}\right),$$

simultaneously taking the logarithm of two sides of the likelihood function, and obtain a logarithmic likelihood function:

$$l(\beta, S^d) = -\frac{n}{2}\ln(2\pi) - \frac{n}{2}\ln(\sigma^2) - \frac{1}{2}\ln|\Omega| - \frac{1}{2\sigma^2}\left[(S^d)^T \Omega^{-1} S^d\right]$$

conducting a partial derivation on the logarithmic likelihood function, and obtaining a likelihood equation:

$$\begin{cases} \frac{\partial}{\partial\sigma^2} l(\beta; S^d) = \frac{n}{2\sigma^2} - \frac{S(\beta)}{2\sigma^4} = 0 \\ \frac{\partial}{\partial\beta} l(\beta; S^d) = \frac{1}{2}\frac{\partial\ln|\Omega|}{\partial\beta} + \frac{\partial S(\beta)}{2\sigma^2 \partial(\beta)} = 0 \end{cases}$$

wherein, $S(\beta) = (S^d)^T \Omega^{-1} S^d$;

calculating a set of equations above, and obtain a maximum likelihood estimation value of an unknown model parameter.

The objectives of the present invention are achieved as below:

The present invention discloses an energy-saving deployment method of a virtual CDN.

In the energy-saving deployment method of a virtual CDN of present invention, according to the historical flow data of the virtual CDN and the prediction model (ARIMA) in the controller, the network peak flow in the next time period is predicted. Next, the scale of the virtual CDN system at the next moment is calculated according to the peak flow. Meanwhile, several redundant servers are added to correct the prediction error. The network flow is aggregated to the desired virtual servers based on the calculation of the controller through a load balancer. In this way, the utilization rate of the virtual CDN system can be increased, and the energy consumed due to the higher utilization rate of the CDN system is saved.

Meanwhile, the energy-saving deployment method of the virtual CDN according to the present invention has the following advantages:

(1) The method is applied in an NFV environment. The method is applicable to a CDN network in an NFV environment. The changing of deployment of the CDN network is more convenient and fast by means of the convenient characteristics brought by the NFV technology.

(2) The method results in a higher service quality. In the present invention, the peak flow in the time period is predicted and the redundant servers are added, so that the capacity of the virtual CDN system is ensured to be capable of handling the sudden flow while the energy is saved.

(3) The method uses an on-demand mode. The invention dynamically adjusts the scale of a virtual CDN system according to changes of network flow, to achieve the ideal target of the on-demand mode. Therefore, resources can be saved.

(4) The method saves the energy of the virtual CDN system. Because the precise prediction algorithm is used, the scale of the virtual CDN system can be adjusted in advance. The network flow is aggregated to keep the virtual CDN system in a high load rate, so that the no-load servers can be closed. Thus, the network flow can be saved.

BRIEF DESCRIPTION OF THE DRAWINGS

FIG. 4 is a schematic diagram of an autocorrelation and a partial autocorrelation of a sequence after a difference;

DETAILED DESCRIPTION OF THE INVENTION

The detailed description of the present invention is described below with reference to the accompanying drawings, so that those skilled in the art can understand the present invention better. It should be noted that, in the description below, when the detailed description of the known functions and designs may weaken the main contents of the present invention, these descriptions will be omitted here.

Embodiment

Figure 1:
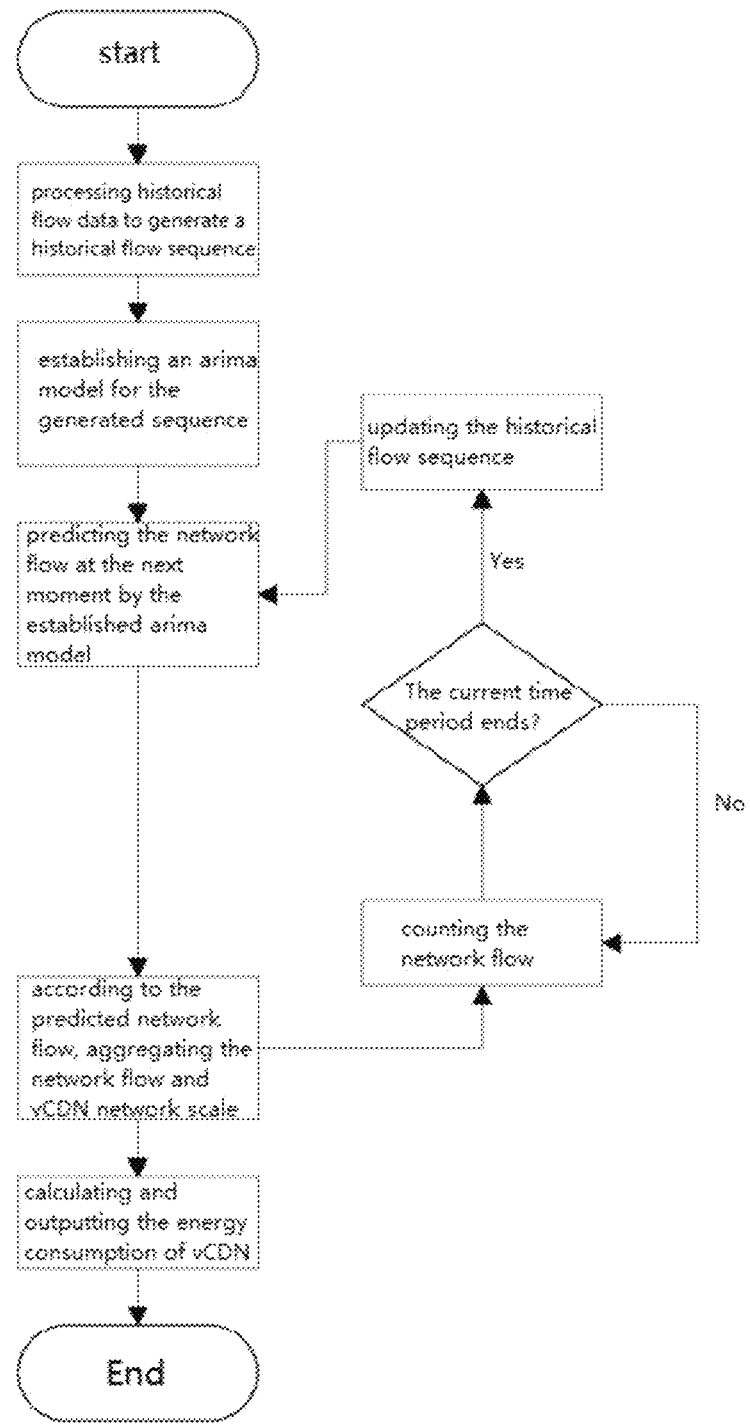
FIG. 1 is a flow diagram of an energy-saving deployment method of a virtual CDN according to the present invention.

FIG. 1 is a flow diagram of an energy-saving deployment method of a virtual CDN according to the present invention.

In this embodiment, as shown in FIG. 1, the energy-saving deployment method of the virtual CDN of the present invention includes the following steps:

S1, Processing historical flow data.

Figure 2:
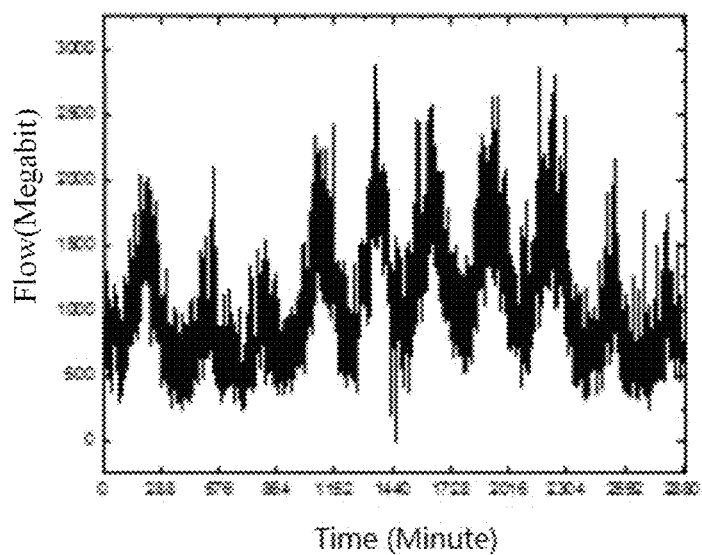
FIG. 2 is a diagram of an average flow data of every five minutes.

In order to ensure that the virtual CDN system can provide peak flow within a period of time, the historical flow data in a plurality of hours are obtained according to the historical data of the network flow. Then, every 5 minutes is taken as a time slice, the average value of the historical flow data in the time slice is calculated to obtain a time sequence S', as shown in FIG. 2.

Figure 3:
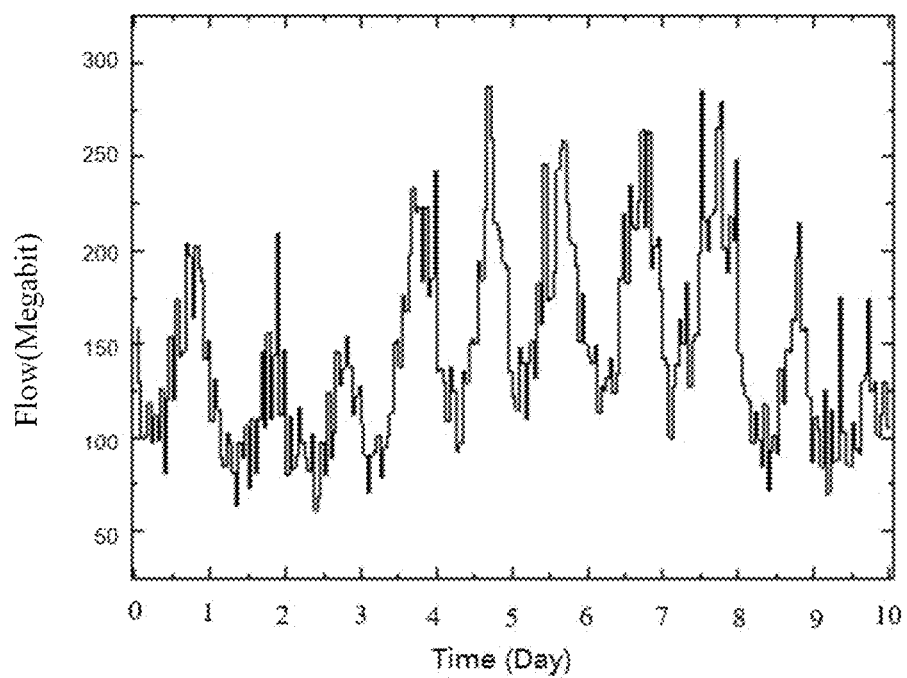
FIG. 3 is a diagram of a maximum flow data within each hour.

Subsequently, every 12 values in the time sequence S' are taken as a group, namely, $S'=\omega_{1_1}, \omega_{1_2}, \ldots, \omega_{1_{12}}, \omega_{2_1}, \omega_{2_2}, \ldots, \omega_{2_{12}}, \omega_{n_1}, \omega_{n_2}, \ldots, \omega_{n_{12}}$, to calculate the maximum value of each group $$\omega_u = \max_{1 \leq k \leq 12} \omega_{v_2}, 1 \leq v \leq n,$$

and obtain the sequence S, $S=\omega_1, \omega_2, \ldots, \omega_n$ as shown in FIG. 3.

In the embodiment, five minutes are selected as onetime slice and is a classic value used in academic and industrial fields. If the value of time slice is too large, the real-time change situation of the flow cannot be demonstrated. If the value of time slice is too small, the disturbance of the sudden change of the instantaneous flow is too large.

S2, Predicting the values of sequence $\omega_{n+1}$.

According to the sequence S, the values of sequence $\omega_{n+1}$ are predicted using an ARIMA(p, d, q) prediction model, wherein d is differential order, p and q are model parameters.

S2.1, Obtaining the sequence after the $d^{th}$ order difference.

The differential order d of the ARIMA(p, d, q) prediction model is determined by the EVIWS software. The differential order d is increased progressively from the zero order (sequence S), and whether the sequence after difference is stable is determined sequentially. If the sequence is stable, the follow-up judgment is stopped and the current order value is taken as the differential order d. In this embodiment, d=1.

The sequence after the $d^{th}$ order difference is $S^d=D(\omega_1)^d, D(\omega_2)^d, \ldots, D(\omega_n)^d$; wherein $D(\omega_i)^d=(1-\Delta)^d\omega_i$, $1 \leq i \leq n$, $\Delta$ can be obtained by recursion below:

$$\Delta\omega_i = \omega_{i-1}$$

$$\Delta^2\omega_i = \Delta(\Delta\omega_i) - \Delta(\omega_{i-1}) = \omega_{i-2};$$

S2.2, Determining the parameters p and q.

A set of an autocorrelation sequence and a partial autocorrelation sequence is obtained according to the sequence after the $d^{th}$ order difference $S^dD(\omega_1)^d, D(\omega_2)^d, \ldots, D(\omega_n)^d$, wherein the values of the autocorrelation sequence and the partial autocorrelation sequence range from 0 to 1. Moreover, the sequence values of the autocorrelation and the partial autocorrelation are integrally attenuated to zero along with the increasing of the subscript values of the sequence.

The two-time confidence interval is defined as [0, 0.05]. The values of the parameters p and q are determined by obtaining the subscript at which the autocorrelation and partial autocorrelation sequence values fall within the two-time confidence interval.

In the embodiment, autocorrelation and partial autocorrelation of the sequence after the difference are shown in FIG. 4. As shown in FIG. 4, we can see that p is equal to 1, and q may be taken as 2 or 3. Upon judgement, the prediction error is smaller when q is taken as 2. Therefore, q is finally determined to be equal to 1, and q is equal to 2.

S2.3, Predicting differential value $D(\omega_{n+1})^d$.

$$D(\omega_{n+1})^d = \zeta_1 D(\omega_n)^d + \zeta_2 D(\omega_{n-1})^d + \ldots,$$
$$\zeta_p D(\omega_{n-p+1})^d + o_{n+1} + k_1 o_n + k_2 o_{n-1} + \ldots, k_q o_{n-q+1}$$

In the formulas, $\zeta_1, \ldots, \zeta_p$ and $K_1, \ldots, K_q$ are model parameters; is $O_n$ random error at the moment n, and $O_n$ conforms to Gaussian distribution and has a zero mean.

In the formulas, a method for estimating model parameters $\zeta_1, \ldots, \zeta_p$ and $K_1, \ldots, K_q$ by a maximum likelihood estimation method is provided as below:

Assuming that the differential sequence $S^d D(\omega_1)^d$, $D(\omega_2)^d, \ldots, D(\omega_n)^d$ conforms to independent multivariate normal distribution, let $\beta = (\zeta_1, \zeta_2, \ldots, \zeta_p, K_1, K_2, \ldots, K_n)^T$ and $\Sigma_n = E(S^d(S^d)^T) = \Omega\sigma_3$, wherein $\Omega$ is covariance matrix of the sequence $S^d$, and $\sigma 2$ is constant variance. Thus, the likelihood function of $S^d$ is $$L(\beta, S^d) = p(D(\omega_1)^d, D(\omega_2)^d, \ldots, D(\omega_n)^d; \beta)$$
$$= (2\pi)^{-\frac{n}{2}} |\Sigma_n|^{\frac{1}{2}} \exp\left\{\frac{(S^d)^T \Sigma_n^{-1} S^d}{2}\right\}$$
$$= (2\pi)^{-\frac{n}{2}} (\sigma^2)^{-\frac{n}{2}} |\Omega|^{-\frac{1}{2}} \exp\left(-\frac{(S^d)^T \Omega S^d}{2\sigma^2}\right)$$

The logarithm of both sides of the formula are simultaneously taken to obtain a logarithmic likelihood function:

$$l(\beta, S^d) = -\frac{n}{2}\ln(2\pi) - \frac{n}{2}\ln(\sigma^2) - \frac{1}{2}\ln|\Omega| - \frac{1}{2\sigma^2}\left[(S^d)^T \Omega^{-1} S^d\right]$$

The partial derivation is conducted on the logarithmic likelihood function, to obtain a likelihood equation:

$$\begin{cases} \frac{\partial}{\partial \sigma^2} l(\beta; S^d) = \frac{n}{2\sigma^2} - \frac{S(\beta)}{2\sigma^4} = 0 \\ \frac{\partial}{\partial \beta} l(\beta; S^d) = \frac{1}{2}\frac{\partial \ln|\Omega|}{\partial \beta} + \frac{\partial S(\beta)}{2\sigma^2 \partial(\beta)} = 0 \end{cases}$$

In the formulas, $S(\beta) = (S^d)^T \Omega^{-1} S^d$.

The equation set above is calculated to obtain maximum likelihood estimation values of unknown model parameters.

Figure 5:
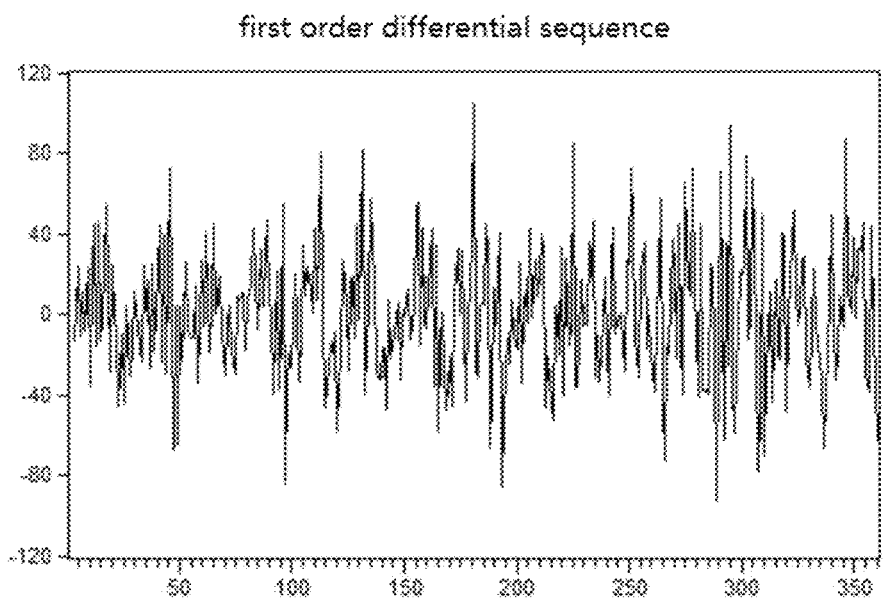
FIG. 5 is a schematic diagram of a first-order differential sequence.
Figure 6:
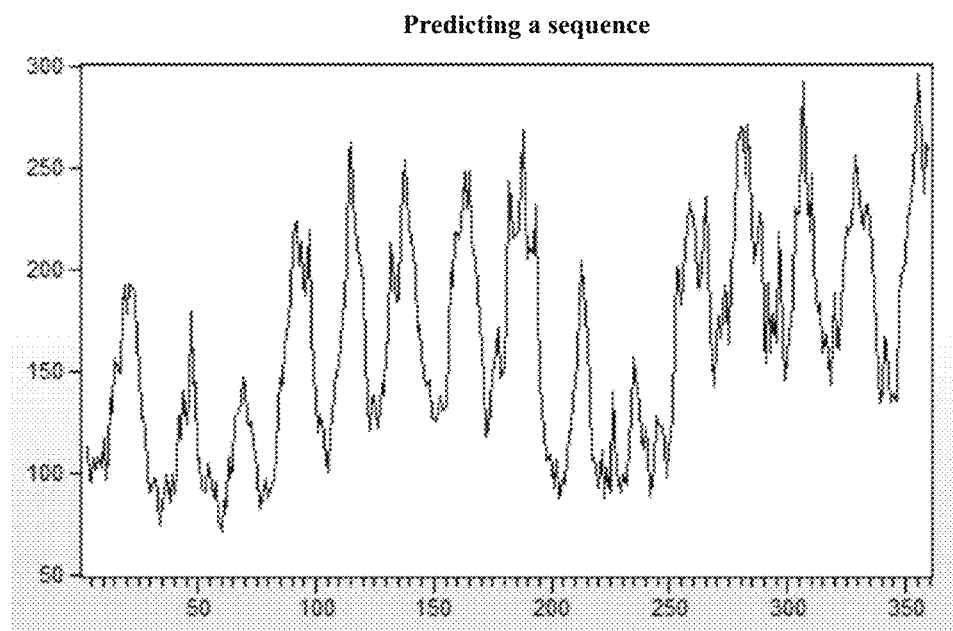
FIG. 6 is a schematic diagram of predicting a sequence $\omega_{n+i}$.

S2.4, The difference formula in the step S2.1 is modified to be $D(\omega_{n+1})^d = (1-\Delta)^d \omega_{n+1}$. Further, in combination with the prediction differential value, the values of the sequence $\omega_{n+1}$ are reversely deduced. In the formula, the first-order differential sequence is shown in FIG. 5. As shown in FIG. 5, the value of the sequence fluctuates up and down in the vicinity of the zero value. Thus, the mean value is zero and the sequence is stable. Therefore, the sequence after the first-order difference can be used for model prediction. Finally, a prediction sequence as shown in FIG. 6 is obtained through the EVIEWS software.

S3, Determining the scale of the virtual CDN system.

S3.1, Calculating the scale of the virtual CDN system through the following formula:

$$num_{n+1} = \left\lceil \frac{\omega_{n+1}}{\lambda * PC} \right\rceil$$

In the formula, PC represents the maximum flow allowed by the function of the single software. $\lambda$ is the percentage of the maximum flow. The value of $\lambda$ is $0<\lambda<=1$. $\lambda$ is used for limiting the flow of the function of the single software to be no more than $\lambda$ times of the maximum value. $num_{n+1}$ represents the number of network functions at the next moment, namely, the scale of the virtual CDN system. $\lceil\ \rceil$ represents upward rounding.

S3.2, Adding redundant servers.

If each general server can load m software-based network functions, the number of the general servers required at the next moment is $$\left\lceil \frac{num_{n+1}}{m} \right\rceil.$$

M is defined as the maximum number of available services. $\mu$, $0 \leq \mu \leq 1$ is the percentage of the maximum value M. $M*\mu$ is the number of the redundant servers.

Then the number of opened servers finally is:

$$num_{n+1} = \min\left(M, M*\mu + \left\lceil \frac{num_{n+1}}{m} \right\rceil\right).$$

S4, Calculating the energy consumption of the virtual CDN system.

S4.1, Energy consumption of a single server is:

$$P(\alpha) = P_{idle} + (P_{peak} - P_{idle}) * \alpha$$

In the formula, $\alpha$, $0 \leq \alpha \leq 1$ is the load rate of a single server. $P_{idle}$ the no-load power. $P_{peak}$ the full-load power.

S4.2, The energy consumption of each server is summed upto obtain the energy consumption of the virtual CDN system.

S5, In the current time period, the flow in the current time period is continuously counted according to the method of the step S1, to obtain the real value of the flow in the current time period. Next, the prediction sequence $\omega_{n+1}$ is corrected through the real value of the flow. Finally, the corrected sequence $\omega_{n+1}$ is added to the tail end of the sequence S. Next, the process returns to the step S2.3 to restart the prediction and deployment work of the next time period.

Although specific embodiments of the present invention are described above to facilitate the understanding of the present invention by those skilled in the art, it should be understood that the present invention is not limited to the scope of specific embodiments. For those skilled in the art, as long as various changes are within the spirit and scope of the invention as defined and determined by the appended claims and all the changes are obvious, all the inventions utilizing the inventive concepts of the present invention fall within the protection scope.

What is claimed is:

1. An energy-saving deployment method of a virtual CDN, comprising:
   (1) processing historical flow data;
   firstly, obtaining historical flow data in a period of time T;
   next, taking time t as a time slice, t<<T, calculating an average value of the historical flow data in the time slice, and obtaining a time sequence;

taking every k values in the time sequence as a group, calculating a maximum value of each group, and obtaining a sequence S, S=$\omega_1, \omega_2, \ldots, \omega_n$;

(2) predicting values of sequence $\omega_{n+1}$;

according to the sequence S, predicting the values of sequence $\omega_{n+1}$ using an ARIMA(p, d, q) prediction model; wherein d is a differential order, p and q are model parameters;

(2.1) obtaining a sequence after $d^{th}$ order difference;

determining the differential order d of the ARIMA(p, d, q) prediction model by an EVIWS software; increasing the differential order d progressively from a zero order, sequentially judging whether the sequence after the difference is stable; if the sequence is stable, stopping a follow-up judgment and taking a current order value as the differential order d;

the sequence after the $d^{th}$ order difference is $S^d = D(\omega_1)^d, D(\omega_2)^d, \ldots, D(\omega_n)^d$;

wherein $D(\omega_i)^d = (1-\Delta)^d \omega_i$, $1 \le i \le n$, $\Delta$ is a differential operator and is obtained by recursion below:

$$\Delta \omega_i = \omega_{i-1}$$

$$\Delta^2 \omega_i = \Delta(\Delta \omega_i) = \Delta(\omega_{i-1}) = \omega_{i-2};$$

(2.2) determining parameters p and q;

obtaining a set of an autocorrelation sequence and a partial autocorrelation sequence according to the sequence $S^d = D(\omega_1)^d, D(\omega_2)^d, \ldots, D(\omega_n)^d$ after the $d^{th}$ order difference;

defining a two-time confidence interval as [0, 0.05]; determining values of the parameters p and q by obtaining a subscript at which the autocorrelation sequence values and partial autocorrelation sequence values fall within the two-time confidence interval;

(2.3) predicting a differential value $D(\omega_{n+1})^d$;

$$D(\omega_{n+1})^d = \zeta_1 D(\omega_n)^d + \zeta_2 D(\omega_{n-1})^d + \ldots,$$
$$\zeta_p D(\omega_{n-p+1})^d + o_{n+1} + k_1 o_n + k_2 o_{n-1} + \ldots, k_q o_{n-q+1},$$

wherein $\zeta_1, \ldots, \zeta_p$ and $K_1, \ldots, K_q$ and are model parameters; $O_n$ is a random error at a moment n, and $O_n$ conforms to Gaussian distribution and has a zero mean;

(2.4) modifying a difference formula in the step S2.1 as $D(\omega_{n+1})^d = (1-\Delta)^d \omega_{n+1}$; next, reversely deducing the values of the sequence $\omega_{n+1}$ based on a prediction differential value;

(3) determining a scale of a virtual CDN system;

(3.1) calculating the scale of the virtual CDN system through a following formula:

$$num_{n+1} = \lceil \frac{\omega_{n+1}}{\lambda * PC} \rceil,$$

wherein PC represents a maximum flow allowable by a function of a single software; $\lambda$ is a percentage of the maximum flow; a value of $\lambda$ is $0 < \lambda \le 1$; $\lambda$ is used for limiting a flow of the function of the single software to be no more than $\lambda$ times of the maximum flow; $num_{n+1}$ represents the number of network functions at the next moment, namely, the scale of the virtual CDN system; and $\lceil \ \rceil$ represents upward rounding;

(3.2) adding redundant servers;

if each general server loads m software-based network functions, the number of the general servers required at the next moment is $$\lceil \frac{num_{n+1}}{m} \rceil;$$

wherein M is defined as a maximum number of available services; $\mu$, $0 \le \mu < 1$ is a percentage of the maximum number M; M*$\mu$ is the number of the redundant servers;

then, the number of finally opened servers is:

$$num_{n+1} = \min\left(M, M*\mu + \lceil \frac{num_{n+1}}{m} \rceil\right);$$

(4) calculating an energy consumption of the virtual CDN system;

(4.1) calculating an energy consumption of a single server as $P(\alpha) = P_{idle} + (P_{peak} - P_{idle})*\alpha$;

wherein $\alpha$, $0 \le \alpha \le 1$ is a load rate of the single server; $P_{idle}$ is a no-load power; $P_{peak}$ is a full-load power;

(4.2) summing up the energy consumption of each server to obtain the energy consumption of the virtual CDN system;

(5) in a current time period, continuously counting a flow in the current time period according to a method of the step S1, and obtaining a real value of the flow in the current time period; correcting a prediction sequence $\omega_{n+1}$ through the real value of the flow; finally, adding a corrected sequence $\omega_{n+1}$ to a tail end of the sequence S, and returning to the step S2.3 to restart a prediction and deployment work of the next time period.

2. The energy-saving deployment method of a virtual CDN of claim 1, wherein in the step 2.3, a method for estimating the model parameters $\zeta_1, \ldots, \zeta_p$ and $K_1, \ldots, K_q$ is utilizing a maximum likelihood estimation method;

if a differential sequence $S^d = D(\omega_1)^d, D(\omega_2)^d, \ldots, D(\omega_n)^d$ conforms to an independent multivariate normal distribution, let $\beta = (\zeta_1, \zeta_2, \ldots, \zeta_p, K_1, K_2, \ldots, K_n)^T$ and $\Sigma_n = E(S^d(S^d)^T) = \Omega \sigma^2$, wherein $\Omega$ is a covariance matrix of the sequence $S^d$, $\sigma 2$ is a constant variance; a likelihood function of $S^d$ is $$L(\beta, S^d) = p(D(\omega_1)^d, D(\omega_2)^d, \ldots, D(\omega_n)^d; \beta)$$
$$= (2\pi)^{-\frac{n}{2}} |\Sigma_n|^{\frac{1}{2}} \exp\left\{-\frac{(S^d)^T \Sigma_n^{-1} S^d}{2}\right\}$$
$$= (2\pi)^{-\frac{n}{2}} (\sigma^2)^{-\frac{n}{2}} |\Omega|^{-\frac{1}{2}} \exp\left(-\frac{(S^d)^T \Omega S^d}{2\sigma^2}\right)$$

simultaneously taking the logarithm of two sides of the likelihood function, and obtaining a logarithmic likelihood function:

$$l(\beta, S^d) = -\frac{n}{2}\ln(2\pi) - \frac{n}{2}\ln(\sigma^2) - \frac{1}{2}\ln|\Omega| - \frac{1}{2\sigma^2}\left[(S^d)^T \Omega^{-1} S^d\right]$$

conducting a partial derivation on the logarithmic likelihood function, and obtaining a likelihood equation:

$$\begin{cases} \frac{\partial}{\partial \sigma^2} l(\beta; S^d) = \frac{n}{2\sigma^2} - \frac{S(\beta)}{2\sigma^4} = 0 \\ \frac{\partial}{\partial \beta} l(\beta; S^d) = \frac{1}{2} \frac{\partial \ln|\Omega|}{\partial \beta} + \frac{\partial S(\beta)}{2\sigma^2 \partial(\beta)} = 0 \end{cases} \quad 5$$

wherein, $S(\beta) = (S^d)^T \Omega^{-1} S^d$;

calculating a set of equations above, and obtaining a maximum likelihood estimation value of an unknown model parameter.

\* \* \* \* \*